US006134489A

United States Patent [19]

Smedley

[11] Patent Number: 6,134,489

[45] Date of Patent: Oct. 17, 2000

[54] AUTOMOBILE CRUISE CONTROL PARAMETER RECORDING APPARATUS

[76] Inventor: Randy C. Smedley, 10908 Lancelot Ct., Little Rock, Ark. 72209

[21] Appl. No.: 08/997,865

[22] Filed: Dec. 24, 1997

[51] Int. Cl.[7] ....................... G06F 7/00

[52] U.S. Cl. ....................... 701/35; 701/32; 701/93; 123/349

[58] Field of Search ....................... 701/28, 29, 35, 701/91, 93, 32; 123/349

[56] References Cited

U.S. PATENT DOCUMENTS

| | | | |
|---|---|---|---|
| 3,204,734 | 9/1965 | McMaken | 192/3 |
| 3,459,052 | 8/1969 | Bemmann | 73/506 |
| 3,476,204 | 11/1969 | Westby et al. | 180/98 |
| 3,713,170 | 1/1973 | Kaufman | 346/136 |
| 4,132,284 | 1/1979 | Tomecek | 180/105 E |
| 4,188,618 | 2/1980 | Weisbart | 701/35 |
| 4,602,127 | 7/1986 | Neely et al. | 179/2 A |
| 4,685,061 | 8/1987 | Whitaker | 701/35 |
| 4,853,850 | 8/1989 | Krass, Jr. et al. | 364/200 |
| 4,875,167 | 10/1989 | Price et al. | 701/35 |
| 4,939,652 | 7/1990 | Steiner | 701/35 |
| 5,250,761 | 10/1993 | Koyanagi | 701/35 |
| 5,396,426 | 3/1995 | Hibino et al. | 364/426.04 |
| 5,442,188 | 8/1995 | Brimbal et al. | 250/566 |
| 5,526,269 | 6/1996 | Ishibashi et al. | 701/35 |
| 5,554,895 | 9/1996 | Ross et al. | 701/93 |
| 5,623,925 | 4/1997 | Swenson et al. | 128/630 |
| 5,710,557 | 1/1998 | Schuette | 701/35 |
| 5,757,300 | 5/1998 | Abe | 701/35 |
| 5,884,202 | 3/1999 | Arjomand | 701/35 |

*Primary Examiner*—Tan Nguyen
*Assistant Examiner*—Gertrude Arthur
*Attorney, Agent, or Firm*—John D. Gugliotta; Michael J. Corrigan

[57] ABSTRACT

An apparatus to aid motor vehicle operators who wish to contest speeding tickets that may have been unjustly issued is disclosed. The invention comprises an electronic interface within a motor vehicle that registers and records the last speed setting of the vehicle's cruise control system. Additional data such as the date, time activated, time deactivated, and the vehicle identification number (VIN) is also recorded. In the event of a suspected speeding violation, the driver would request the law enforcement officer to download this information into a hand held display device carried by the law enforcement officer. The hand held display device would print out two copies of the above information, one for the officer and one for the driver. In the event of a dispute, where the driver wishes to contest the speeding ticket, the print out would be admissible in court as evidence against speeding.

8 Claims, 3 Drawing Sheets

AUTOMOBILE CRUISE CONTROL PARAMETER RECORDING APPARATUS

RELATED APPLICATIONS

The present invention was first described in Disclosure Document Number 413,328 filed on Jul. 3, 1997.

BACKGROUND OF THE INVENTION

1. Field of the Invention

The present invention relates generally to automobile cruise control systems and, more particularly, to an automobile cruise control parameter recording apparatus used to record prior settings as an aid in contesting speeding tickets.

2. Description of the Related Art

In the related art, several attempts have been made to give motor vehicle operators the ability to register or record vehicle speed settings as an aid in contesting speeding violations given by law enforcement officers. These attempts have ranged from simple chart recorders to complex electro/mechanical systems using speed sensing input means, computer control systems, radio communication links and the like. A search of the prior art did not disclose any patents that read directly on the claims of the instant invention; however, the following references were considered related:

| U.S. Pat. No. | Inventor | Issue Date |
|---|---|---|
| 5,623,925 | Michael Swenson, et al. | Apr. 29, 1997 |
| 5,442,188 | Michael Brimbal, et al. | Aug. 15, 1995 |
| 5,396,426 | Katsuhiko Hibino, et al. | Mar. 7, 1995 |
| 4,853,850 | James Krass, et al. | Aug. 1, 1989 |
| 4,602,127 | James Neely, et al. | Jul. 22, 1986 |
| 4,132,284 | Jerry Tomecek | Jan. 2, 1979 |
| 3,713,170 | Harry Kaufman | Jan. 23, 1973 |
| 3,476,204 | Lloyd Westby, et al. | Nov. 4, 1969 |
| 3,459,052 | Richard Bemmann | Aug. 5, 1969 |
| 3,204,734 | Gerald McMaken | Sept. 7, 1965 |

The previous art consists of several devices in which the user is able to set the speed of a motor vehicle at a predetermined value or is aided in the recording of operational parameters. These devices, however, have one or more of the following problems.

First, the devices can be complex, and therefore, expensive to manufacture. The public is less likely to purchase an expensive automobile cruise control parameter recording apparatus.

Second, the use of such devices generally requires substantial equipment or modifications to the motor vehicle and are thus not cost effective.

Third, the uses of such devices are susceptible to tampering and thus may not be admissible as evidence during courtroom proceedings.

Fourth, many of the previous devices utilize mechanical components which are more prone to calibration errors than their electronic counterparts.

Fifth, most of the previous devices are limited to controlling the speed of a motor vehicle only and provide no provisions for recording the parameters of said speed settings.

Sixth, some of the previous devices provide for the recording of operational parameters but do not address the requirements of recording the operating parameters of a motor vehicle cruise control system in a manner that may be admissible as evidence in courtroom proceedings.

Consequently, a need has therefore been felt for an improved but less complex mechanism that allows for an automobile cruise control parameter recording apparatus.

SUMMARY OF THE INVENTION

It is therefore an object of the present invention to provide an improved automobile cruise control parameter recording apparatus.

It is therefore another object of the present invention to provide for an improved automobile cruise control parameter recording apparatus that allows for the recording of operational parameters of a motor vehicle's cruise control system for use as evidence against speeding during courtroom proceedings.

It is yet another object of the present invention to provide for an improved automobile cruise control parameter recording apparatus that is universally used and accepted by law enforcement personnel.

It is yet another object of the present invention to provide for an improved automobile cruise control parameter recording apparatus that is not susceptible to tampering and thus is admissible as evidence against speeding during courtroom proceedings.

It is yet another object of the present invention to provide for an improved automobile cruise control parameter recording apparatus that encourages safe driving habits within legal speed limits by eliminating the chance of speeding violations based on inaccurate data.

Briefly described according to the preferred embodiment of the present invention, the invention is comprised of an electronic interface within a motor vehicle that registers the latest speed setting of the vehicle's cruise control system. Additional data such as the date, time activated, time deactivated, and the vehicle identification number (VIN) is also recorded. In the event of a suspected speeding violation, the driver would request the law enforcement officer to download this information into a hand held display device carried by the law enforcement officer. The hand held display device would print out two copies of the above information, one for the officer and one for the driver. In the event of a dispute, where the driver wishes to contest the speeding ticket, the print out would be admissible in court as evidence against speeding.

An advantage of the present invention is that it discourages law enforcement officers from setting up "speed traps" in an area repeatedly to produce money revenues.

Another advantage of the present invention is that it protects motorists against inaccurate or uncalibrated speed detection devices used by law enforcement officers such as radar and/or vascar.

Another advantage of the present invention is that it is simple, and therefore, inexpensive to manufacture. This savings, if passed on to the consumer, may influence the public to utilize such a device. A simple design also increases product reliability and useful product lifetime.

Another advantage of the present invention is that its compact and small design is easily installed into the existing confines of any motor vehicle.

Another advantage of the present invention is that it utilizes the sensors of current cruise control systems and is thus a very small incremental cost in the overall cost of a motor vehicle.

Another advantage of the present invention is that it is easily produced from readily available materials using known manufacturing techniques, thus allowing for an economical product.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
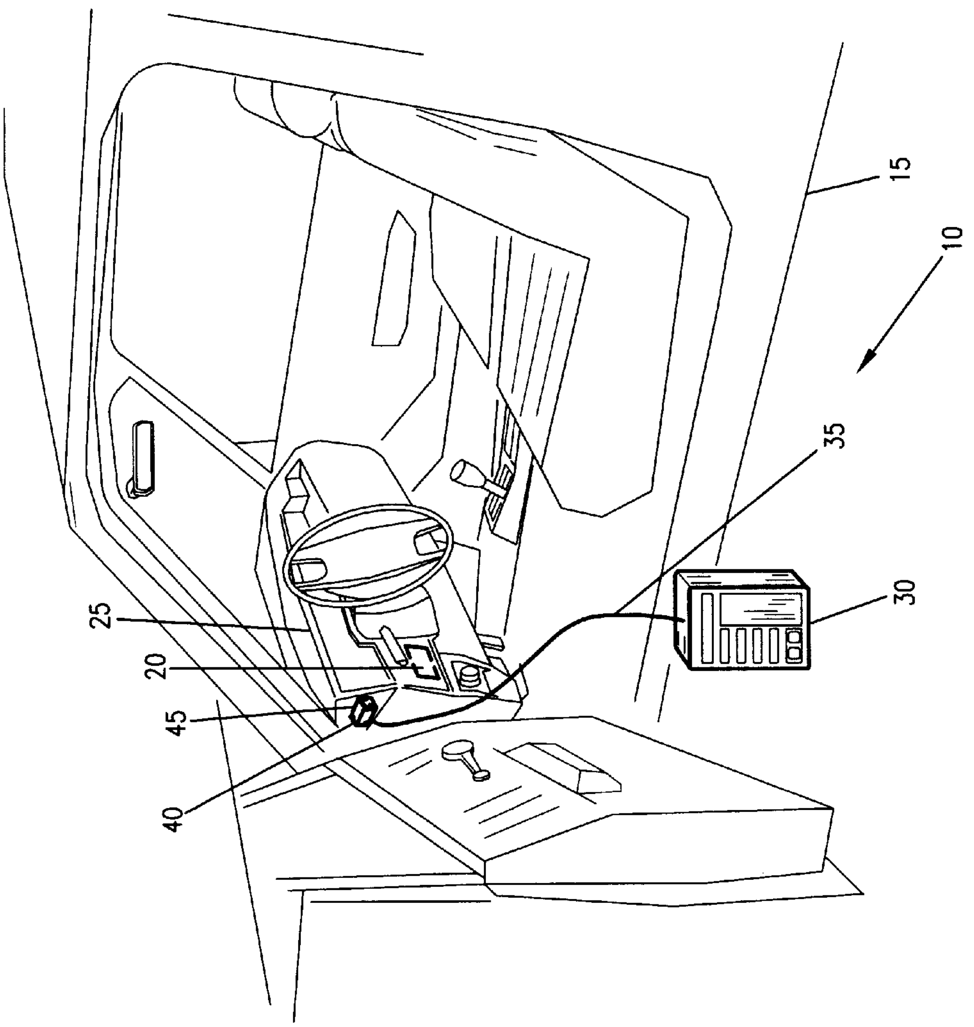
FIG. 1 is a perspective view of the automobile cruise control parameter recording apparatus shown in a utilized state on a motor vehicle.

Referring now to FIG. 1, a perspective view of the automobile cruise control parameter recording apparatus 10 shown in a utilized state on a motor vehicle 15 is disclosed. The automobile cruise control parameter recording apparatus 10 consists of an interface module 20, located behind a dashboard 25 of the motor vehicle 15, and a hand held display device 30. The hand held display device 30 is connected to the interface module 20 via a data cable 35, an interface plug 40 and an interface jack 45. The hand held display device 30 will be described in greater detail hereinbelow. The interface jack 45 is located on a readily accessible portion of the dashboard 25 that allows for the interface plug 40 to be connected during a traffic stop by the law enforcement officer. The location of the interface module 20 allows for short wire runs to interface with existing automobile control circuits such as the cruise control circuitry, power supply circuitry and date and clock circuitry.

Figure 2:
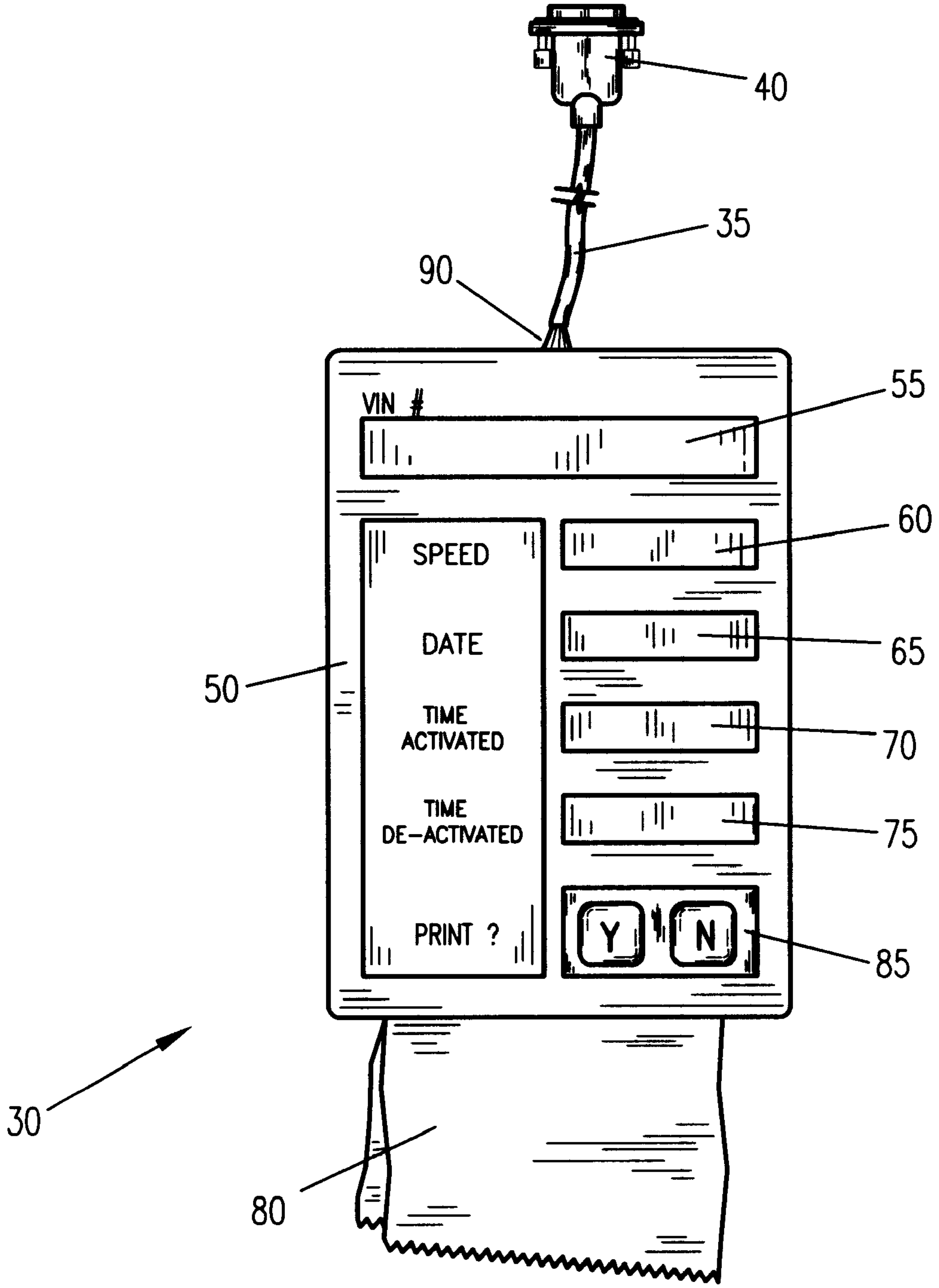
FIG. 2 is a detailed front view of the hand held display device as used with the automobile cruise control parameter recording apparatus.

Referring next to FIG. 2, a detailed front view of the hand held display device 30 is depicted. The hand held display device 30 is comprised of a main housing 50 envisioned to be manufactured from high-impact plastic or other similar strength material. On the front or face of the hand held display device 30 is a first digital readout 55 to display the Vehicle Identification Number (VIN) of the motor vehicle 15 (not shown in this FIG.) under question. The Vehicle Identification Number (VIN) would match the corresponding number of the motor vehicle 15 (not shown in this FIG.) which would be preprogramed by the manufacturer and not changeable by the user. Directly below the first digital readout 55 is a second digital readout 60. The second digital readout 60 displays the last speed setting in miles per hour or kilometers per hour which was programmed into the cruise control system of the motor vehicle 15 (not shown in this FIG.). Directly below the second digital readout 60 is a third digital readout 65 which displays the date on which the speed setting, that is displayed on the second digital readout 60, was programmed. It is envisioned that the date input for the third digital readout 65 would be derived through settings on the radio system of the motor vehicle 15 (not shown in this FIG.). The purpose of the third digital readout 65 is to establish the date on which the cruise control was last used. It must obviously match the date on which the suspected speeding violation occurred. Located directly below the third digital readout 65 is a fourth digital readout 70. The fourth digital readout 70 displays the time at which the cruise control was activated. This occurs in a manner similar to the third digital readout 65 via the settings on the radio settings of the motor vehicle. Finally, a fifth digital readout 75 is located directly below the fourth digital readout 70 and serves to establish when the cruise control was last deactivated. The third digital readout 65, the fourth digital readout 70, and the fifth digital readout 75 serve to establish that the cruise control system was in use immediately prior to the traffic stop for the suspected speeding violation, and the displayed speed as seen on the second digital readout 60, was the speed at which the motor vehicle 15 (not shown in this FIG.) was traveling. If this information is in conflict with the information gathered by the law enforcement officer using other means of speed detection such as radar of vascar, the driver would be entitled to use the information displayed by the hand held display device 30 in his or her defense against the speeding ticket. To preserve the information displayed on the hand held display device 30 as evidence, a dual copy print out 80 is produced out of the bottom of the hand held display device 30. The dual copy print out 80 is controlled by a printer control panel 85 on the face of the hand held display device 30 directly below the fifth digital readout 75. The dual copy print out 80 provides for one copy for the driver of the motor vehicle 15 (not shown in this FIG.) and one copy for the law enforcement officer. The data cable 35 exits the main housing 50 on the top as shown through a strain relief 90, and after a sufficient length of data cable 35 it terminates in the interface plug 40. The interface plug 40 would be a standardized, universal design such that it may connect to any motor vehicle 15 (not shown in this FIG.) no matter the make, year or model. It should be noted that the hand held display device 30 would be carried by the law enforcement officer and would be produced and utilized upon request of the motorist.

Figure 3:
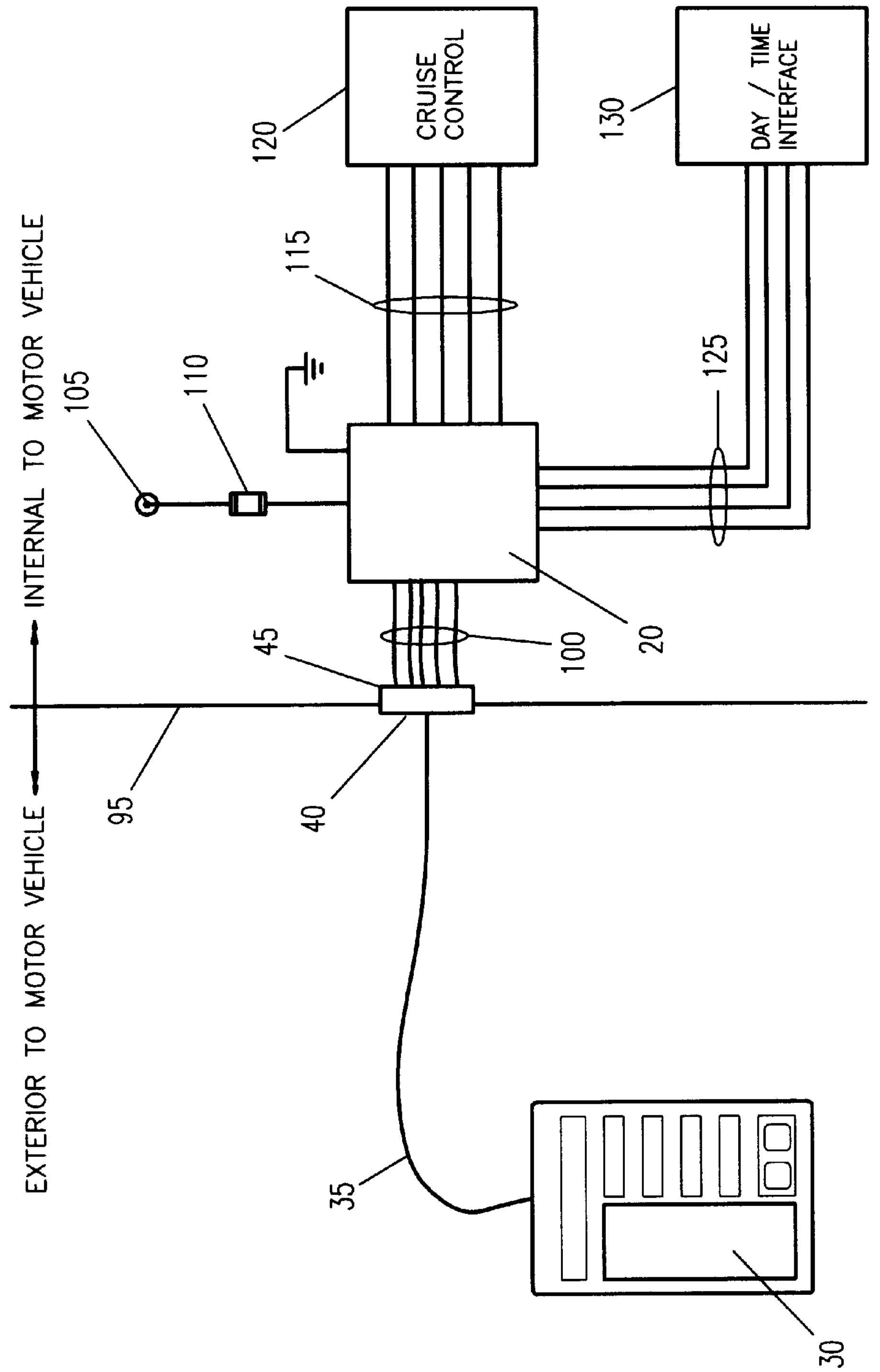
FIG. 3 is an electrical interconnection diagram depicting the major electrical components of the automobile cruise control parameter recording apparatus.

Referring finally to FIG. 3, an electrical interconnection diagram of the automobile cruise control parameter recording apparatus 10 is disclosed. A demarcation line 95 indicates those components of the automobile cruise control parameter recording apparatus 10 that would be located external to the motor vehicle 15 (not shown in this FIG.) and provided by the law enforcement officer (left side) and those components provided as an integral part of each motor vehicle 15 (not shown in this FIG.) (right side). The interface plug 40 with its integral hand held display device 30 and data cable 35 is shown connecting into the interface jack 45. The interface jack 45 provides the digital data stream in serial format to the hand held display device 30 through the interface plug 40 and the data cable 35. The interface jack 45 receives this digital data stream from the interface module 20 via a first interconnecting ribbon cable 100. The interface module 20 receives its electrical power from a vehicle power source 105 as protected by a fuse 110. The vehicle power source 105 not only provides power to the interface module 20, but to the hand held display device 30 through the data cable 35 as well. In a likewise manner, the fuse 110 protects the interface module 20 and the hand held display device 30 against over current and/or short circuit conditions which may occur within the hand held display device 30 or the data cable 35 itself. Next, a second interconnecting ribbon cable 115 relays digital information to the interface module 20 from a cruise control electronics package 120. This information is envisioned to include data such as, but not limited to, current cruise control speed setting, cruise control activated or deactivated, and past cruise control speed settings. Additionally, a third interconnecting ribbon cable 125 relays digital information to the interface module 20 from a day/time interface module 130. This information is envisioned to include such data as, but not limited to the current time and the current date. It should be noted that the day/time interface module 130 can take the forms of many different configurations. One such form may be the time and date interface on a digital clock that is part of the motor vehicle 15 (not shown in this FIG.) existing radio system. It may also be a stand alone day and time module that is common place on many motor vehicles. Finally, it may also be a stand alone module that is part of the interface module 20. Further advancements in technology, such as auto time set by satellite signals or radio signals is also visualized as a pliable configuration. The Vehicle Identification Number (VIN) is envisioned to be a permanent, unalterable parameter of the interface module 20, and will remain with the motor vehicle 15 (not shown on this FIG.) on which it is installed for the life of the motor vehicle 15.

2. Operation of the Preferred Embodiment

In operation, the present invention can be easily utilized by the common user in a simple and effortless manner. To use the present invention with its preferred embodiment can best be described in conjunction with the perspective view of FIG. 1, the detailed front view of FIG. 2, and the electrical interconnection diagram of FIG. 3.

After purchase of a motor vehicle 15 equipped with an automobile cruise control parameter recording apparatus 10, the user would utilize the motor vehicle 15 in a manner identical to a motor vehicle 15 not equipped with an automobile cruise control parameter recording apparatus 10. The user would drive the motor vehicle 15 in a normal safe manner as is customarily expected. When utilizing the cruise control, the user would program a safe, legal speed which is not above what ordinances or driving conditions permit. During this phase of the operation of the motor vehicle 15, the interface module 20 continually records the operating parameters of the cruise control, as well as the day and time at which the various parameters occurred as aforementioned described. In the event the user is subjected to speed detection devices during this course of normal driving with the cruise control activated, the user is protected against any errors these speed detection devices have been historically known to exhibit. These errors include but are not limited to uncalibrated sensors, wrong vehicle identification, utilization errors, and environmental misapplications. At the point of issuance of a speeding violation, the automobile cruise control parameter recording apparatus 10 is ready to protect the user by providing evidence against speeding.

The user at this point would request the law enforcement officer to download the current data from the interface module 20. The law enforcement officer would provide the hand held display device 30 and plug the associated interface plug 40 into the interface jack 45 of the motor vehicle 15. After the current stored data consisting of the Vehicle Identification Number (VIN), last speed setting, date of last speed setting, time last speed setting was activated, and the time the last speed setting was deactivated is displayed on the hand held display device 30, the law enforcement officer would activate the printer control panel 85 of the hand held display device 30 and produce a dual copy print out 80. One copy of the dual copy print out 80 would be for the driver, or user, and the other copy would be for the law enforcement officer and any subsequent legal officials. If the displayed data verifies that the user was not operating the motor vehicle 15 above the legal or safe speed limits, and the user wishes to contest the speeding ticket, the user would be entitled to use his or her portion of the dual copy print out 80 as evidence against speeding during any subsequent legal proceedings in a customary manner.

The foregoing description is included to illustrate the operation of the preferred embodiment and is not meant to limit the scope of the invention. The scope of the invention is to be limited only by the following claims.

What is claimed is:

1. An automobile cruise control parameter recording apparatus, comprising:

an interface module, said interface module located behind a dashboard of a motor vehicle and providing an interface jack, said interface module interfacing with existing automobile control circuits of the cruise control circuitry, power supply circuitry and date and clock circuitry; and a hand held display device, said hand held display device connected to the interface module via a data cable having an interface plug for connection with said interface jack;

and wherein said interface jack allows for the interface plug to be connected during a traffic stop by a member of law enforcement;

wherein said hand held display device is comprised of:

a main housing;

a first digital readout display on the front or face of said hand held display device, said first digital readout for displaying the Vehicle Identification Number (VIN) of the motor vehicle;

a second digital readout directly below the first digital readout for displays the last speed setting in miles per hour or kilometers per hour which was programmed into the cruise control system of the motor vehicle;

a third digital readout directly below the second digital readout for displaying the date on which the speed setting, that is displayed on the second digital readout, was programmed.

2. The automobile cruise control parameter recording apparatus of claim 1, wherein said third digital readout retrieves the date via the settings on the radio settings of the motor vehicle.

3. The automobile cruise control parameter recording apparatus of claim 2, further comprising:

a fourth digital readout located directly below the third digital readout for displaying the time at which the cruise control was activated in a manner similar to the third digital readout 65 via the settings on the radio settings of the motor vehicle.

4. The automobile cruise control parameter recording apparatus of claim 3, further comprising:

a fifth digital readout located directly below the fourth digital readout displays the date and time when the cruise control was last deactivated.

5. The automobile cruise control parameter recording apparatus of claim 4, further comprising means to provide a dual copy print out of the information produced by said hand held display device;

wherein said dual copy print out provides for one copy for the driver of the motor vehicle and one copy for the law enforcement officer.

6. The automobile cruise control parameter recording apparatus of claim 1, wherein said interface module provides a digital data stream in serial format to the hand held display device through the interface plug and the data cable, and further wherein said interface jack receives said digital data stream from the interface module via a first interconnecting ribbon cable.

7. The automobile cruise control parameter recording apparatus of claim 6, further comprising:

a cruise control electronics package; and a second interconnecting ribbon cable for relaying digital information to the interface module from said cruise control electronics package, said digital information including current cruise control speed setting, cruise control activated or deactivated, and past cruise control speed settings;

a day/time interface module; and a third interconnecting ribbon cable relays digital information to the interface module from said day/time interface module.

8. The automobile cruise control parameter recording apparatus of claim 7, wherein said day/time interface module comprises an interface on a digital clock that is part of the motor vehicle.

* * * * *